United States Patent [19]
Demos

[11] Patent Number: 5,465,119
[45] Date of Patent: Nov. 7, 1995

[54] PIXEL INTERLACING APPARATUS AND METHOD

[75] Inventor: Gary Demos, Culver City, Calif.

[73] Assignee: DemoGraFX, Culver City, Calif.

[21] Appl. No.: 659,227

[22] Filed: Feb. 22, 1991

[51] Int. Cl.$^6$ .............................. H05N 7/01; H05N 11/20
[52] U.S. Cl. ......................... 348/447; 348/910; 348/470
[58] Field of Search ........................ 358/36, 37, 11,
358/105, 80, 137, 138, 139, 140, 166, 167,
177, 181, 182, 183, 429, 457, 465, 455,
462, 466, 456, 464, 467, 463; 340/725,
728, 729; 364/552, 521; 348/441, 447,
448, 450, 454, 470, 429, 455, 456, 462,
464, 466, 467, 457, 607, 608, 622, 623;
H04N 11/20, 7/01

[56] References Cited

U.S. PATENT DOCUMENTS

| | | | |
|---|---|---|---|
| 4,727,430 | 2/1988 | Miwa | 358/459 |
| 4,758,893 | 7/1988 | Lippel | 358/37 |
| 4,897,806 | 1/1990 | Cook et al. | 340/725 |
| 5,025,400 | 6/1991 | Cook et al. | 340/725 |
| 5,043,815 | 8/1991 | Yoshimura et al. | 358/36 |
| 5,136,371 | 8/1992 | Savatier et al. | 358/133 |

*Primary Examiner*—James J. Groody
*Assistant Examiner*—Michael H. Lee
*Attorney, Agent, or Firm*—Spensley Horn Jubas & Lubitz

[57] ABSTRACT

An image processing system uses a pseudo-random pixel interlace method and apparatus for capturing groups of pixels as image frames. This pseudo-random method eliminates the artifacts commonly present in standard regular line raster scan imaging systems. Moreover, the pixel interlacing method permits the construction of higher resolution frames from a series of orthogonal lower resolution frames. An enhancement circuit deduces information from previous pixel group frames and contributes additional detail to the pixels of the frame being processed. The format of the pixel interlaced groups permits the present invention to be used in a wide variety of normally incompatible target display rates. The present invention can also be used in a computing system as an auto-synchronizer for processing signals from different sources.

19 Claims, 14 Drawing Sheets

PIXEL INTERLACING APPARATUS AND METHOD

BACKGROUND OF THE INVENTION

1. Field of the Invention

The present invention is directed to a device for capturing and processing image information using a pseudo-random pixel interlace. This process permits the use of this image information by a variety of normally incompatible interfaces.

2. Related Art

There are four common frame rates used in moving imagery in the world today. In the U.S. and Japan, NTSC has a 59.94 Hz interlaced field rate. In Europe, PAL and SECAM have a 50.0 Hz interlaced field rate. The motion picture industry predominantly uses 24 frame per second film. Some High Definition Television (HDTV) proposals use 60.0 Hz interlaced fields (such as the Japanese standard developed by NHK, also called SMPTE 240M and BTA001), and some use 60.0 Hz progressively scanned images (non-interlaced) (presently under discussion in the United States). Thus 24, 50, 59.94, and 60.0 Hz are common picture frame rates in the world.

On motion picture film, 30 Hz, 60 Hz, and 72 Hz have all been used on occasion.

On computer displays, progressively scanned (noninterlaced) images are often displayed at 66 Hz (Apple Macintosh II color screen), 70 Hz, 72 Hz, 75 Hz, and 76 Hz. These CRT screen refresh rates exceed 60 Hz because the 60 Hz rate flickers excessively under fluorescent lights in bright viewing environments as found in most offices.

For covering sports, motion rates faster than 45 Hz are felt to be required.

Further, current television formats have either 240 lines per field for NTSC or 288 lines per field for European PAL. In other countries, such as those in South America, other combinations of PAL and NTSC line formats and rates are found.

With limited exceptions, these frame rates and line formats are incompatible with each other. For a single viewable event, therefore, this incompatibility makes it necessary to have a number of different corresponding video image capturing and formatting devices in order for different end-viewers to be able to view the event. Similarly, the incompatibility makes it extremely difficult to transfer information recorded in one format to another format.

For example, when moving images are captured in the U.S. in NTSC, they must be converted to European PAL for display in Europe, or to other formats. This conversion process is sometimes called "transcoding". Both the field and frame rates, as well as the number of scan lines must be converted. This transcoding conversion process is usually expensive. Worse yet, the results of transcoding are often felt to be poor, and the transcoding process is prone to aliasing artifacts and resolution degradation, as well as motion degradation.

As indicated above, some of the present-day systems use interlace as part of the video format. Interlace is a technique which is used to provide some motion at 50 or 59.94 or 60 Hz for sports coverage. However, interlace is prone to aliasing artifacts, both temporally (in time) and spatially (on image details). Further, interlace makes it difficult to perform transcodings, since scan lines do not sample the correct portions of the image as are required for proper transcodings to other formats. Thus, a "de-interlacer" is often used to simulate the removal of interlace before applying transcoding. Such de-interlacers are also prone to motion and picture detail artifacts and image resolution degradation.

An objective of the present invention therefore is to provide a format for images that is high quality and capable of use by any presently-used or contemplated picture rate.

Another fundamental problem of many present image formats is that they use interlace, which is a regular undersampling pattern. Such patterns are known in the art to be improper theoretical image filters, and which result in temporal and spatial artifacts through the regularity of the sampling pattern and the interaction of this pattern with natural patterns of detail in the image.

An object of the present invention, therefore, is to provide a sampling pattern that minimizes temporal and spatial artifacts.

Another object of the present invention is to provide an image format that is compatible with all the commonly used picture rates, as well as those rates expected in the future.

Moreover, any proposed image format should be usable by variety of displays to show varying degrees of quality, as appropriate for each display, from the same signal.

Thus, another objective of the present invention is to provide a distribution signal format where a variety of displays, at various levels of cost and performance, can be used when receiving the signal.

Further, the present invention allows a variety of images derived from different picture sources to be displayed individually on the same screen, or to be combined together for a composite image. The present invention thus eliminates the need for complex frame buffering normally required to provide synchronization for such simultaneous displays of images.

The present invention incorporates a method referred to herein as "pixel interlacing." The present method is referred to as pixel interlacing since it involves the extension of the concept of line interlace on a pixel-by-pixel basis.

Because pixel interlacing in the present invention does not use regular sampling patterns, the pixel interlace sampling pattern is theoretically able to avoid aliasing artifacts. Those artifacts which remain are in the form of image position irregularities in a noise-like position offset. The present pixel interlace method can be seen to be similar to the irregular manner in which film grains produce images. Such artifacts are typically quite small in the image, and are therefore unnoticed by the majority of viewers. In the present invention, position errors never exceed the size of a pixel interlace sample (a "pixel plate" as described below), and are therefore bounded in the size of the position error.

SUMMARY OF THE INVENTION

The present invention embraces two main modes of operation. The first mode, uses a fixed higher display and camera frame rate D (e.g. 72 Hz). An added frame buffer allows accumulation of a better picture when the image is still, is motion compensated, or when using film or other slower media at their slower frame rate F (e.g. 24 Hz). The accumulation of multiple D/F (e.g. 3) images forms higher quality frames at the F rate.

An added enhancement unit provides that when the imagery is fast-moving, and needs to change at the D rate, the display updates directly at the D rate, without accumulating resolution though multiple frames at the D rate. At rates between F and D, other accumulations of multiple frames at the D rate are also possible (e.g. 36 Hz). Using longer frame times than the F rate, frames that are not fast moving (e.g. are relatively stationary, or that can be motion compensated), can accumulate more frames at the D rate, for longer time periods, and further increase the displayed resolution.

The second mode of operation uses a camera frame rate substantially higher than the display rate. This rate is the LCM (least common multiple) rate (e.g. 1800 Hz), of various target display rates. Example target display rates might include 24 Hz (fps), 25 Hz (fps), 50 Hz, 60 Hz, 72 Hz, and 75 Hz of the kind explained above and used in the film industry, NTSC, PAL, HDTV, computer displays, etc. The purpose of this mode of operation is to support multiple display rates simultaneously from the same source picture stream signal. The camera or picture processing device produces frames at the LCM rate with pixels scattered in special pseudo-random distributions (a Poisson distribution is one example) such that they accumulate into higher resolution frames at any of the target display rates.

The present invention is only limited by the maximum bandwidth of the system. This parameter determines how many pixels (or pixel plates) per second can be processed (assuming no compression).

DETAILED DESCRIPTION OF THE INVENTION

Pixels and Pixel Plates

Figure 1:
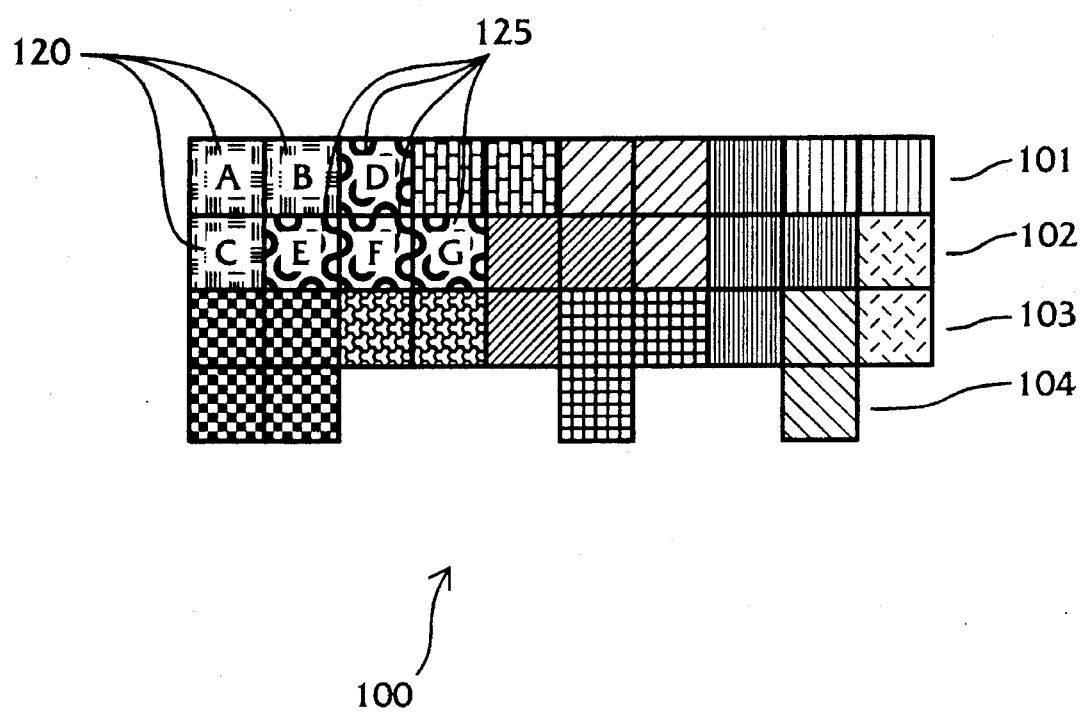
FIG. 1 shows an example of a typical section of an image as captured by the present system, including representative pseudo-random pixel plates.

FIG. 1 shows the basic building block of the present invention. A representative sample of pixels 100 corresponding to a portion of a video camera field is shown. For purposes of the present invention, pixels 100 are shown as square blocks, but other non-standard shapes (including, for example, circles, triangles or hexagons) may be used. Within this sample of pixels 100 for a particular image frame, various groupings of pixels may be seen, comprised of irregular shapes and combinations of different numbers of pixels. In the present embodiment, 2, 3, or 4 individual pixel groups are used, but other combinations may be used. These combinations are generally referred to herein as "pixel plates." For example, pixels A, B and C (shown in a generally upside down "L" shape) correspond generally to a pixel plate 120. Other combinations are also shown, including an upside down "T" shaped pixel plate 125. The entire image field of a video camera can thus be seen as divided up into a series or set of pseudo-random pixel plates. Each frame taken of the image field is comprised of a different set of pseudo-randomly shaped and placed pixel plates.

Generating Pixel Plates

The pseudo-random pixel plates (including their shapes) can be pre-chosen using various computer simulations. An optimal set of pixel plate shapes can thus be generated ahead of time for any particular application. The present invention may also be used in conjunction with non-orthogonal pixel raster formats. For example, non-standard raster topologies (non-x-y coordinate) including, hexagonal, diagonal and even pseudo-random rasters may be used.

The constraints for generating the pixel plates are the following:

1) The resulting pattern of pixel plates should minimize regularity, in that regularity results in aliasing artifacts on moving images whose spatial frequencies or their harmonics are near the sampling intervals;

2) The spatial distribution sets of pixel plates should be relatively orthogonal (in different places) to maximize the information available to any subsequently created higher resolution frames;

3) Each frame's pixel plate spatial pattern should maximize sampling fidelity, meaning that the spot sampling areas should be as near to round as possible, and should minimize empty spaces and overlap.

It will be apparent to the skilled artisan that constraints 1 and 3 are in conflict. Constraint 3 wants the raster to be regular, while constraint 1 wants it to be random. Although, at first, this might seem like an over-constrained problem, there have been similar challenges in computer graphics and imaging which have generated acceptable solutions.

In particular, one method that may be employed to generate the pixel plate sets of the present invention has been described in the computer graphics context in an article by Rob Cook, entitled "Stochastic Sampling In Computer Graphics", published in vol. 5, no. 1, Jan. 1986, Pages 51–57 of the Association for Computing Machinery Transactions on Graphics and incorporated by reference herein. The technique described therein relies on a "Poisson Disk Distribution," and is used as the basis for anti-aliasing in several computer graphics software algorithms currently in use. This technique uses the results of research into the distribution of photo-receptors on the retina.

Computer simulations of the placement of these receptors showed that the placement corresponded approximately to the following algorithm:

1) Choose a random position for the receptor.
2) If the receptor is too near to any existing receptor, try again.
3) Continue until no new receptor can be placed anywhere.

This is a simple algorithm for placing the receptors at random but not on top of one another. A similar algorithm could be employed to place the pixel sets of the present invention.

This spatial distribution has proven very effective in forming the basis of point-sampling distributions which result in statistically artifact-free results. The more sample distributions placed and tested for optimal quality, the better the quality of the resulting distribution. Other algorithms resulting in other pseudo-random distributions could be used equally well in the present invention.

Image Capturing Subsystem 200

Figure 2:
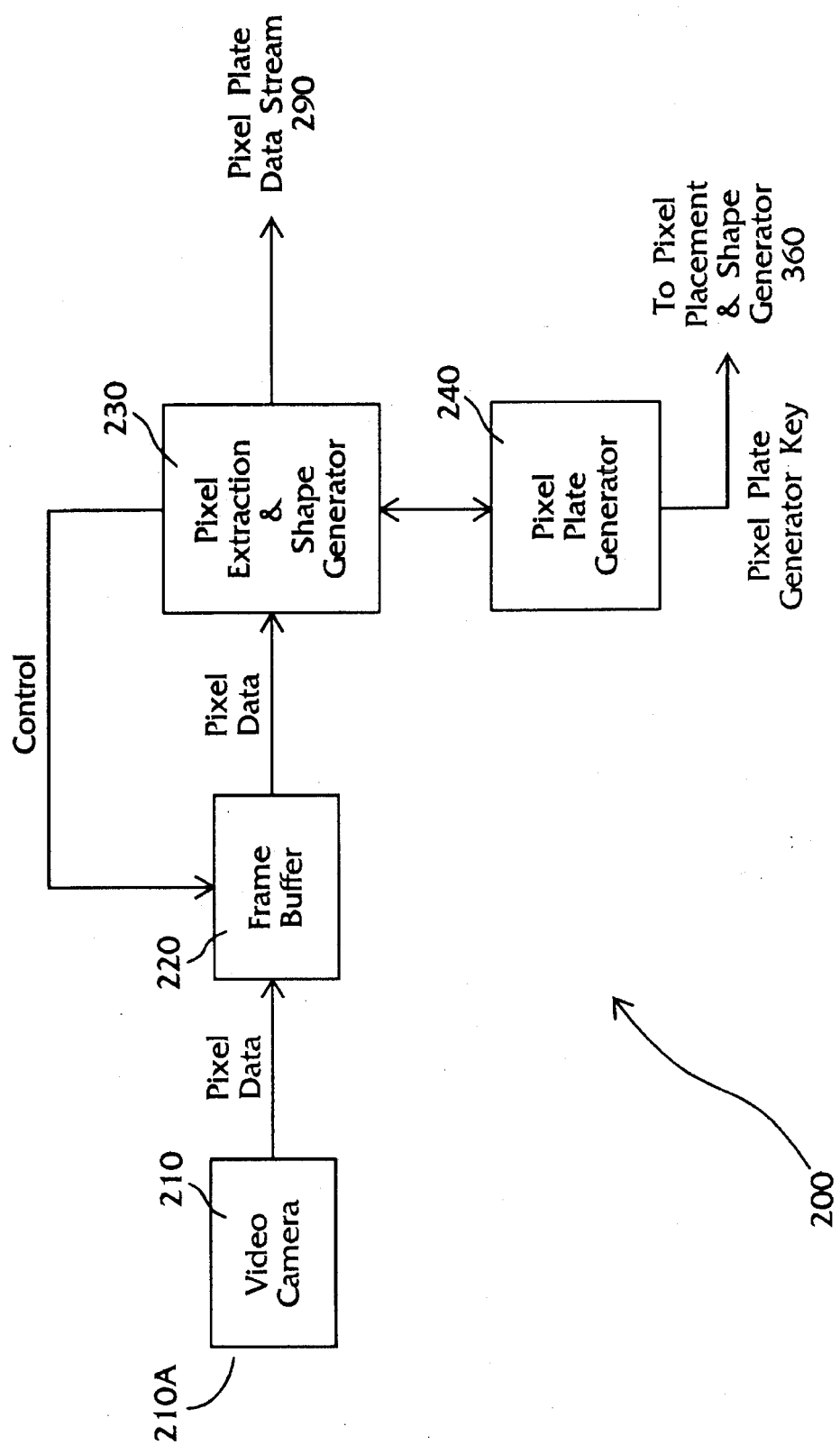
FIG. 2 is a block diagram of a first embodiment of the image generating and capturing sub-system.

FIG. 2 shows the image capturing sub-system 200 of the present invention used for the first mode of operation. A second image capturing sub-system is described further below with respect to the second operating mode.

A video camera 210, includes an image field 210A for capturing image information by way of the pixels A, B, C, etc. (FIG. 1) described above at a fixed frame rate D. In one preferred embodiment, 72 Hz is used as the image frame rate D, but any rate that results in non-noticeable flicker for the resulting display is satisfactory. The values of these pixels in the image field 210A are captured using standard techniques, and this data is stored as a complete image frame in frame buffer 220. Alternatively, video camera 210 can capture the pixel plate samples directly using a non-standard raster scan.

The pixel plates 120, 125, etc., (FIG. 2) are then extracted digitally under control of a pixel plate extraction circuit 230 using pseudo-random pixel plate mappings pre-stored in a pixel plate generator 240. Pixel plate generator 240 may include a pseudo-random generator for creating the pixel plates in the manner described above, or alternatively, may have the pseudo-random pixel plate patterns pre-stored in non-volatile memory. It should be noted that pixel plate generator 240 in general uses a different set of pseudo-randomly generated pixel plates for each complete image frame of pixel plates captured, but may repeat the pixel plate pattern at some regular number of frames. As noted above, video camera 210 may also generate the pseudo-random pixel plate groups directly using an internal pseudo-pseudo-random pixel plate generator, in which case pixel plate extraction circuit 230 is unnecessary.

Before being transmitted by the extraction circuit or video camera, the pixel plate groups may be compressed in order to maximize the bandwidth of the system. Compression and decompression algorithms are well-known in the art, and may include discrete cosine transforms, subband coding, huffman coding, entropy coding, arithmetic coding, etc. Moroever, for images that are moving, motion compensation information may also be included as part of a compressed pixel plate data. Such motion compensation information can be in the form of motion vectors or similar format.

The advantages of extracting the pixels in this manner (i.e., pseudo-randomly placed pixel plates in pixel scan lines 101, 102, 103, etc.) lies in the fact that in regular line raster scanning of pixels (e.g., interlaced scanning pixel line 101, then 103, etc.), aliasing artifacts are created by moving images whose spatial frequencies or their harmonics are near the regular sampling intervals of the raster scan. The present invention therefore, by virtue of its irregular, pseudo-random pixel extraction results in an image with minimized aliasing artifacts.

First Embodiments Basic Pixel Data Buffering and Display System Operating

Figure 3:
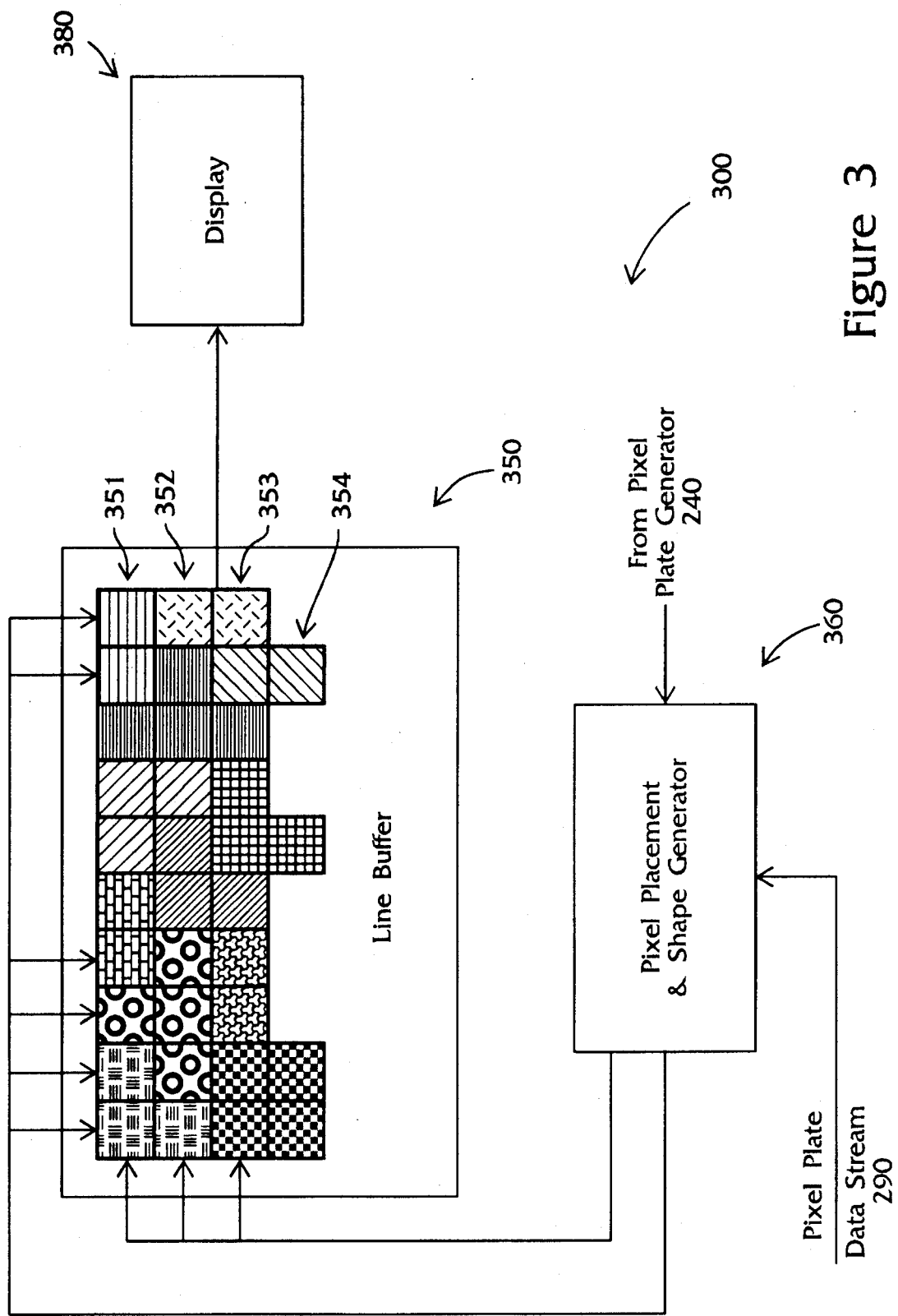
FIG. 3 is a block diagram of a first embodiment of the present invention in which display image frames are generated from a series of pixel-interlaced viewable sub-frames.

Referring to FIG. 3, pixel plates from image capturing sub-system 200, are transmitted as a pixel plate data stream 290 to a first embodiment of a Pixel Data Buffering and Display System.

In operation, a pixel placement & shape generator 360 receives and places the pixel plates 120, 125, etc., from pixel plate data stream 290 into the correct positions within a Line Buffer 350. This is accomplished using one of the following methods:

(1) in an embodiment where the image capturing sub-system 200 is remote from the sub-system 300, a pixel plate pseudo-random generator "key" is transmitted as part of the pixel plate data stream 290. This key is used by the pixel placement & shape generator 360 to reconstruct and properly place the pixel plates 110 in Line Buffer 350. For example, pixel plate 120, comprised of pixels A, B and C on lines 101 and 102 in FIG. 1, can be seen to occupy a corresponding position on lines 351 and 352 of Line Buffer 350 in FIG. 3.

(2) alternatively, in another embodiment, a pre-conditioned pseudo-random sequencer within pixel placement & shape generator 360 can operate independently to reconstruct the pixel plate sequences.

These are but two possible techniques, and other equally usable methods will become apparent to the those skilled in the art. Additionally, if the pixel plate information in the pixel plate data stream has been data compressed, pixel placement & shape generator 360 first decompresses the pixel plate data using a corresponding decompression algorithm.

The output from the pixel placement and shape generator 360 is sent to a multi-line buffer 350. The output of the multi-line buffer 350 can be used to drive any kind of display 380, including an active matrix display, or a Digital-to-Analog Converter (DAC) connected to a CRT. In this first embodiment, therefore, the images are generated by the image capturing sub-system 200 at a fixed rate D (72 Hz in a preferred embodiment), and then displayed at this same rate (72 Hz) on a display 380.

Alternatively, the output of the multi-line buffer 350, since it is now back in a common video format, can be further transmitted to a remote display receiver, via any suitable land link, or broadcast transmission.

Figure 4:
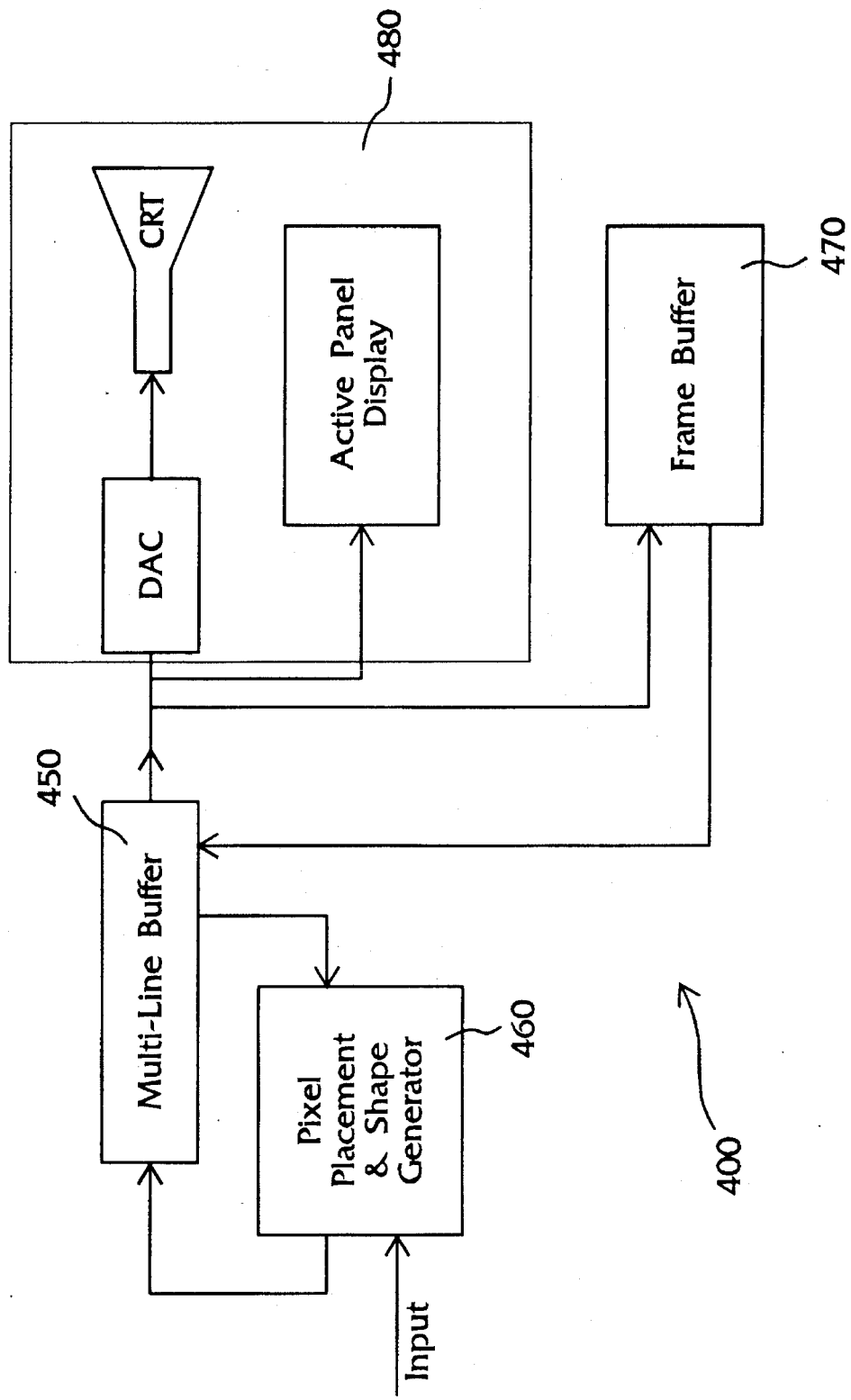
FIG. 4 is a block diagram of a second embodiment of the present invention, in which a frame buffer is added, and in which higher resolution images are created from lower resolution pixel-interlaced images.

Second Embodiment: Basic Pixel Data Buffering and Display System, Including Frame Buffer Another embodiment of the Pixel Data Buffering and Display System is shown in FIG. 4. This embodiment includes a frame buffer 470 that accumulates higher quality pictures and transmits them to one or more displays 480 in the manner now described. The accumulation of a better picture can be made when the image is still, is motion compensated or when using film or other slower media at their slower frame rate F (e.g. 24 Hz). An example of motion compensation using motion vectors can be seen in U.S. Pat. No. 4,985,767; other similar techniques could be used with the present system. The accumulation of multiple fast lower resolution images forms higher quality frames at a slower rate.

As indicated above, the embodiment of FIG. 3 captures images at fixed rate D using the image capturing sub-system 200. In the embodiment of FIG. 4, an image capturing sub-system 200 can be used, but multiple frames at the lower resolution rate D (e.g. 72 Hz) are accumulated in Frame Buffer 470 to result in higher resolution images at another rate F. In a preferred embodiment, D is 72 Hz and F is 24 Hz; again, other values of D may be used (e.g. 50 Hz, 60 Hz, 75 Hz, 80 Hz, 90 Hz and 96 Hz may be useful for some applications), and other values of F may be used (e.g.. 36 Hz, 30 Hz, 25 Hz, 20 Hz and 18 Hz.) Groups of D/F (e.g.. 3) captured lower resolution image frames are stored in Frame Buffer 470; this corresponds to a higher resolution picture frame rate F (e.g. 24 Hz, or 24 fps for film) that can be viewed on display 480. The pixel group frames (D rate lower resolution image frames containing pixel plates) should be designed so that as many as possible of the individual pixels are covered in the resulting F rate higher resolution image. For longer accummulations of pixel groups (e.g. F/2 or 12 Hz, or 2D/F frames at D rate) all of the pixels should be covered.

Figure 4A:
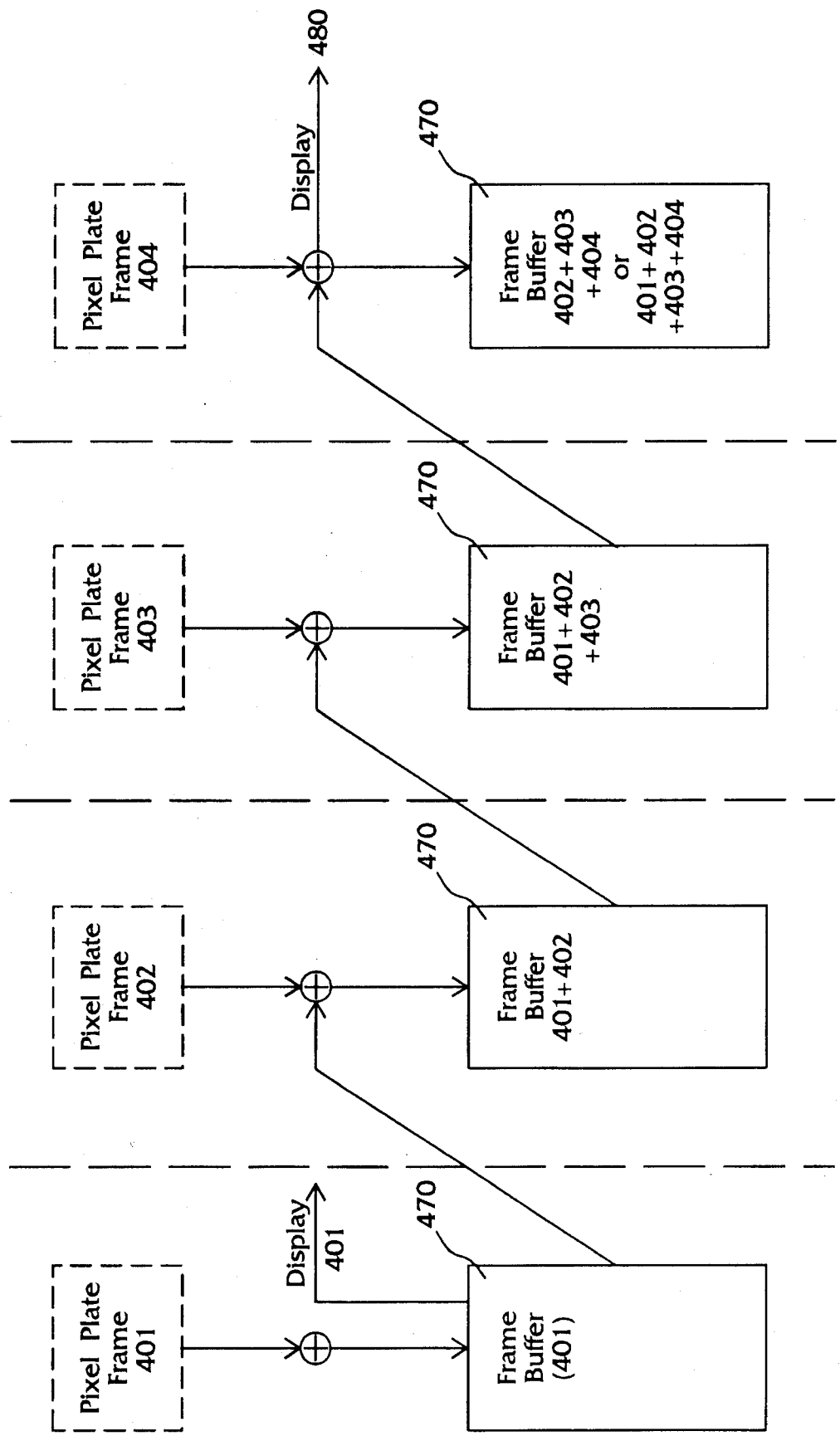
FIGS. 4A–B depict the formation of higher resolution viewable images from lower resolution viewable images in accordance with the methods of the embodiment shown in FIG. 4.

In operation, an input line consists of a pixel data stream 290 from sub-system 200. This data stream 290 is received and re-created in proper pixel plate placement in multi-line buffer 450 in an identical manner to that described for FIG. 3. Referring to FIG. 4A, pixel plate frame 401, generated at the D rate, is stored in Frame Buffer 470. Then, frame 401 is read during the receipt of the next frame 402, and the two are combined to produce a higher quality resulting frame. This resulting frame is then re-written into the frame buffer 470 (or a separate frame buffer that is generally part of frame buffer 470). The process is repeated D/F (e.g. 3) times to obtain the best quality higher resolution image and is then sent to the display each time with the display updated at the D rate. This higher quality image can be continually updated at the D rate, using the previous ((D/F)−1) frames, combined with the current frame. This produces a steady-state running update at the D rate.

Figure 4B:
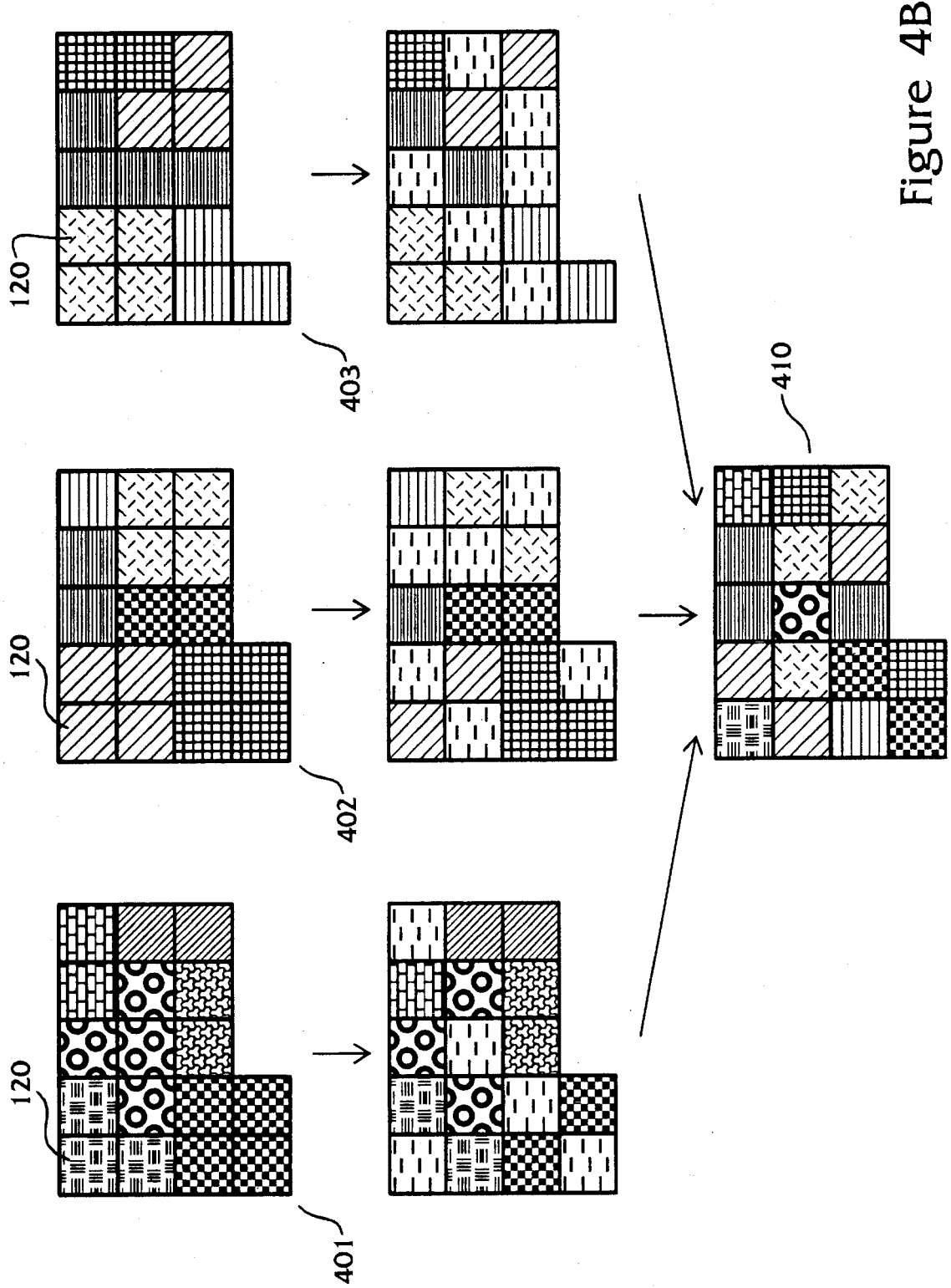

Referring to FIG. 4B, it can be seen that in this mode of operation, each pixel plate 120 from the pixel plate frames 401, 402, 403, fills an average of D/F (e.g. 3) pixels in a D rate frame, but only contributes to a single pixel at the final F rate frame 410 (e.g. after 3 frames at the D rate). Each pixel plate from the D rate frame is centered over its corresponding position on the F rate frame, and the three separate pixel plate sets from the three frames are relatively orthogonal, as discussed above. Thus, for example, in FIG. 1, pixel plate 120 (pixels A, B and C) is centered about pixel A; pixel plate 125 (pixels D, E, F and G) is centered about pixel F, and similarly for the rest of the pixel plates in any pixel plate frame.

Finally, as also indicated above, such groupings of D/F (e.g. 3) frames can be stored in a separate section of the frame buffer 470, and sent to the display with a D (e.g. 72 Hz) refresh rate, where the frame is updated at the F (e.g. 24 Hz) rate, or updated as a running update at the D rate, covering most individual pixels using the previous ((D/F)−1) frames, where the image is sent to the display operating at the F rate.

Third Embodiment: Basic Pixel Data Buffering and Display System, Including Frame Buffer and Enhancement Unit While the second embodiment of FIG. 4 allows higher resolution images as a result of accumulating lower resolution images, this method is limited, as described earlier, to situations where the image is still, is motion compensated, or when using film or other slower media. The capability of the FIG. 4 embodiment may be significantly improved, however, with the use of an enhancement circuit 590 as shown in FIG. 5.

Figure 5:
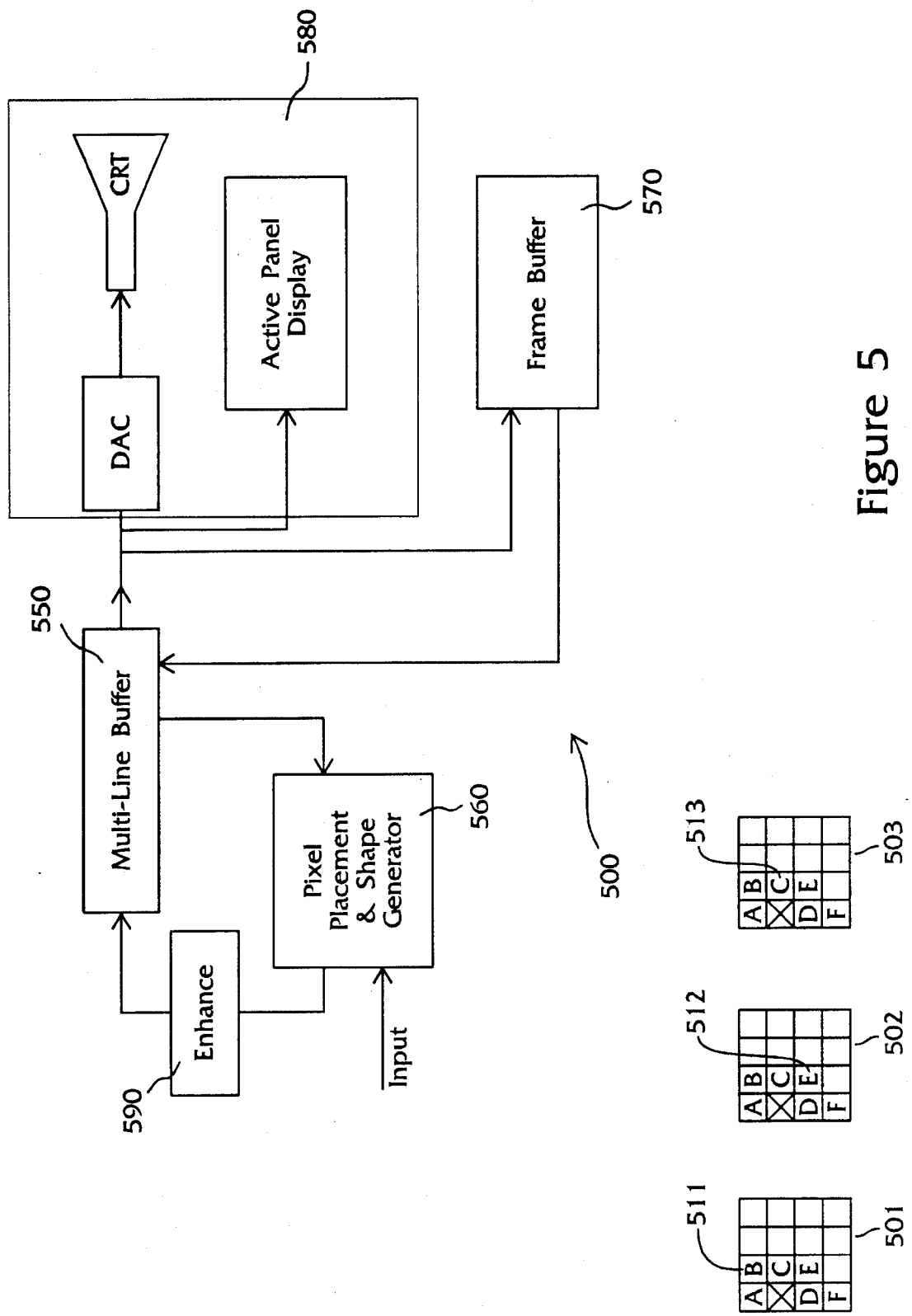
FIG. 5 is a block diagram of a third embodiment of the present invention, in which an enhancement unit is used for variably computing higher resolution images from differences between lower resolution pixel-interlaced images.

Referring to FIG. 5, the enhancement circuit 590 assures that when the imagery is fast-moving, and needs to change at the faster D rate, then display 580 updates directly at the D rate, without accumulating higher resolution F rate frames through multiple frames at the D rate. When the imagery is not fast-moving, frames are accumulated using enhancement to obtain higher displayed resolution. The determination of whether the imagery is fast-moving or not involves examining regions of pixel plates in the faster D rate frames. For example, in the present system, enhancement circuit 590 examines regions of 64 pixels (8 by 8 squares). The structures and methods for performing such motion detection are well-known in the art, and can easily be implemented by the skilled artisan in the present invention. Motion compensation can also be used when a displacement vector is used to select appropriate locations in previous frames at the D or F rates to provide input to the enhancement circuit.

Referring to FIG. 5, the pixel plates from a frame 501 are processed and placed in multi-line buffer 550 by pixel placement & shape generator 560, in the same manner as described above for the FIG. 3 and 4 embodiments. Frame 501 is also stored in frame buffer 570. A portion of frame 501 can be seen in the lower part of FIG. 5, including pixel plate 511, and an individual pixel denoted "X." A new frame 502 is also shown; as can be seen, a different pixel plate 512 overlaps with the pixel plate 511 in the area of pixel X. The values of the prior pixel plates 511, 512 from pixel frames 501 and 502 are retrieved from a pixel plate buffer within the pixel placement & shape generator 560, or from the frame buffer 570. Some deduction can be made from pixel plate 511 and 512 values as to the individual value of pixel X. In the present embodiment, a weighting scheme is used that depends on the geometry of the camera, the pixels, the lens, and the pixel plates. A gaussian spot can be used as a model for the pixels based on the values from the pixel plates. In such a spot, a well-known pyramidal weighting function is used to estimate the value of the individual pixels in the pixel plate. Other methods known in the art could also be used to evaluate the value of individual pixels.

As the third frame 503 is processed, a determination is made as to whether the general region where the pixels are located is not moving or can be motion compensated; if this region is fast moving (i.e. is not stationary or cannot be motion compensated), the pixel plates (including pixel plate 513) are placed directly in the multi-line buffer 550, frame buffer 570 and to the display 580. If the region is not fast moving, the value of pixel X is estimated from pixel plate 513, and then combined with the information concerning pixel X that has been gleaned from the prior frames 501 and 502 is used to arrive at a differentially computed final value for pixel X.

Figure 6:
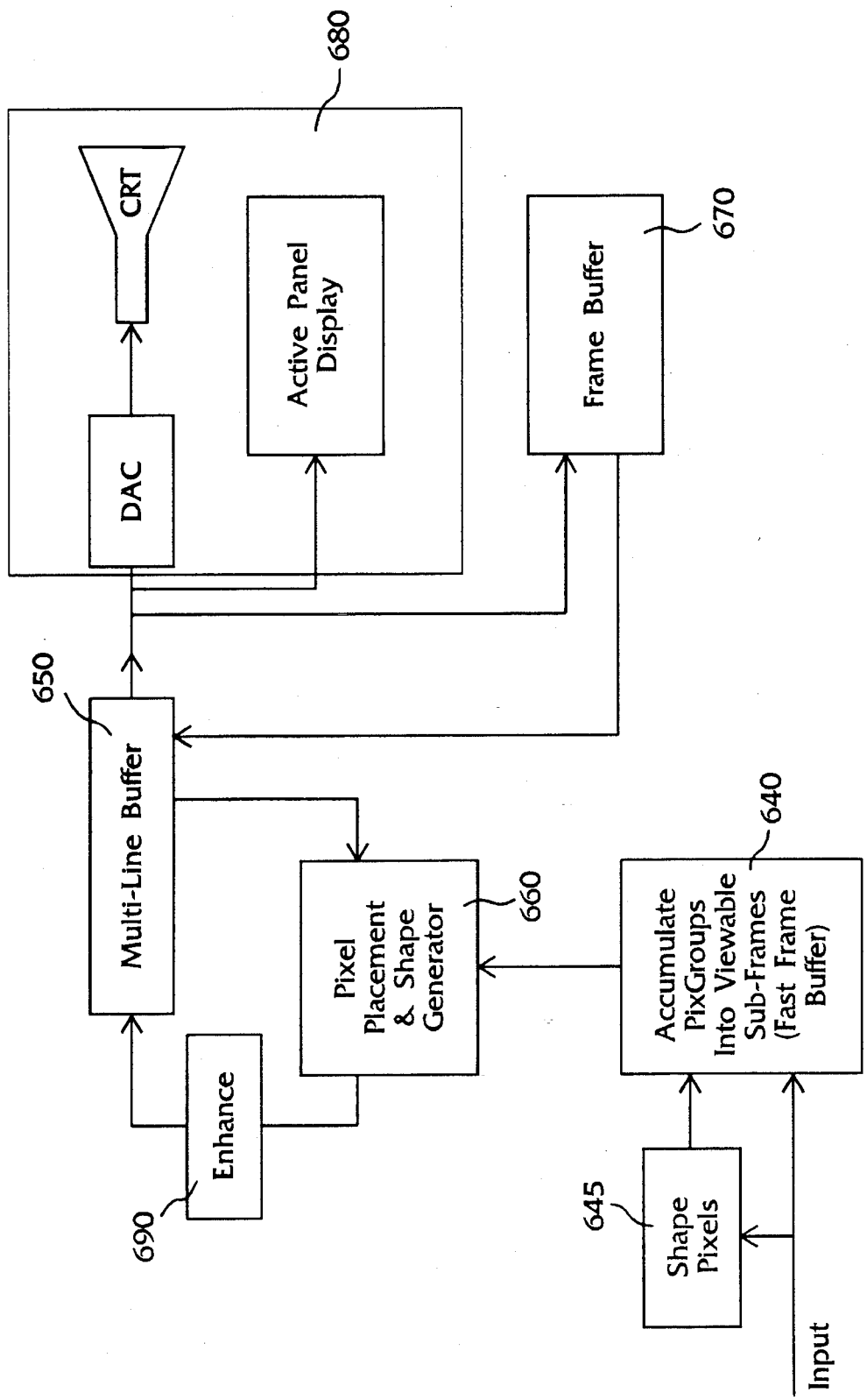
FIG. 6 is a block diagram of a fourth embodiment of the present invention, in which the pixel-interlaced images are captured at rate higher than any target display rate, and a fast-frame buffer accumulator is used along with a pixel shaping unit to process the faster captured pixel-interlaced images.

Fourth Embodiment: Faster Image Capturing System Using Pixel Group accumulations of pixel plates FIG. 6 illustrates the basic buffering and display system for the second mode of operation of the present invention. As indicated above, this mode of operation uses a camera frame rate higher than the display rate. In a preferred embodiment, this camera frame rate is the LCM (least common multiple) rate (e.g. 1800 Hz), of various target display rates described above (24 Hz (fps), 25 Hz (fps), 50 Hz, 60 Hz, 72 Hz, and 75 Hz) as used in the film industry, NTSC, PAL, HDTV, computer displays, etc.

Faster Image Capturing Subsystem

Figure 7A:
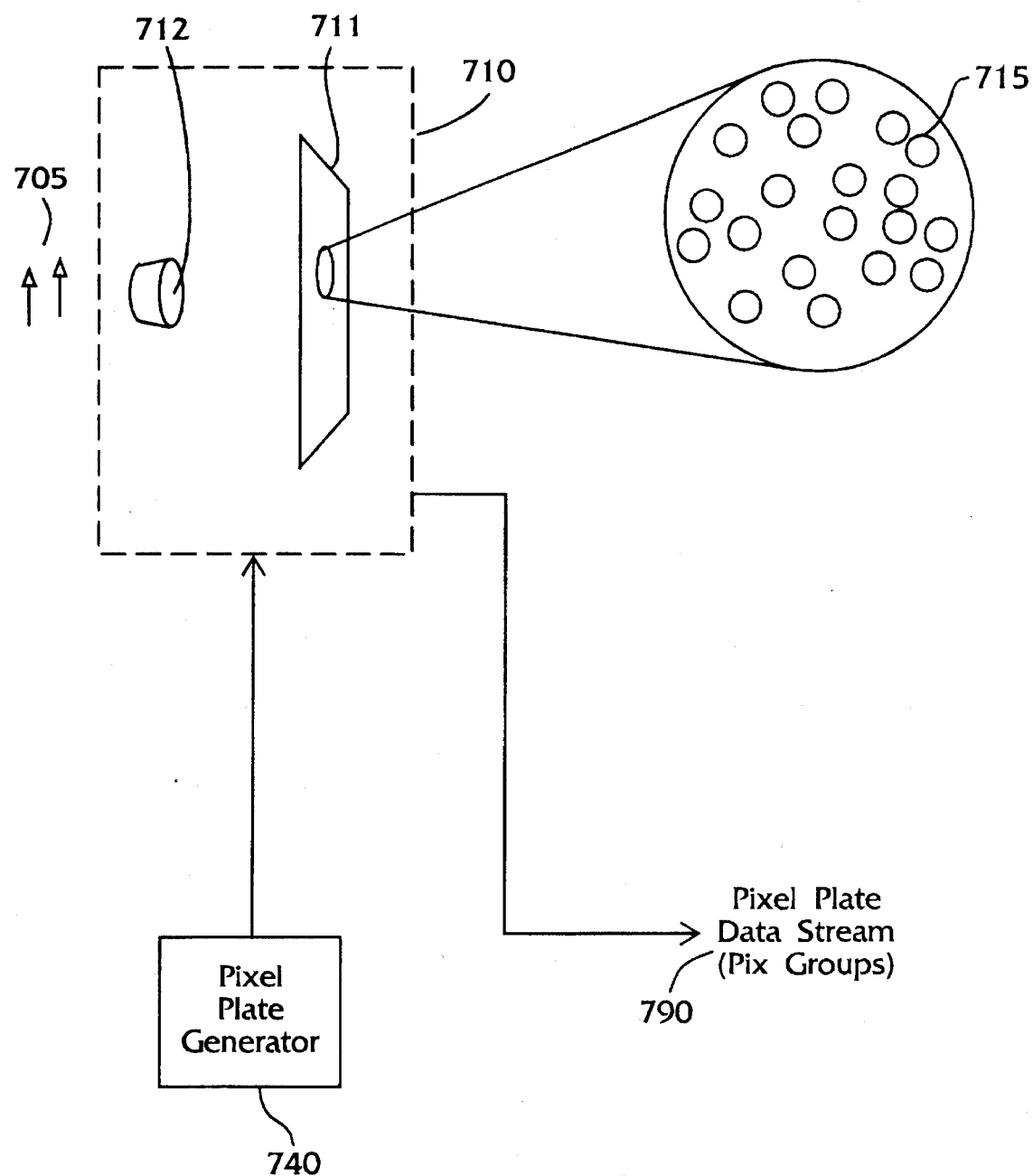
FIG. 7A is a block diagram of a second embodiment of the image generating and capturing sub-system, in which the pseudo-random pixel plates are generated directly via a camera.
Figure 7B:
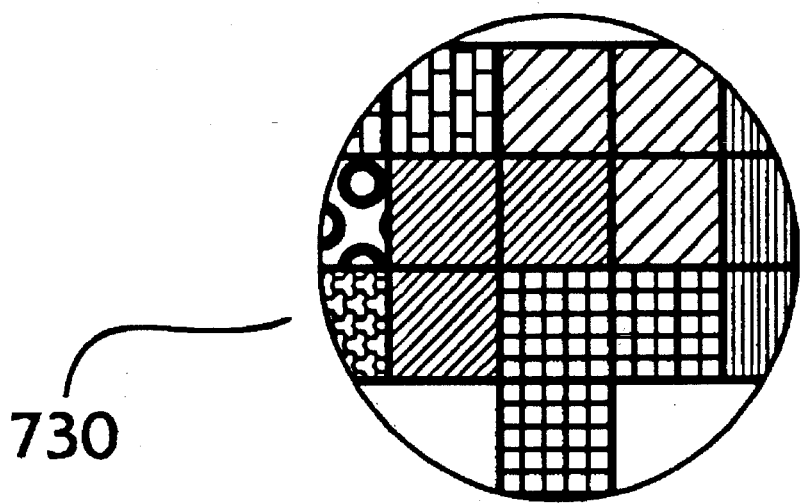
FIG. 7B is a magnified view of the imaging target.

Referring to FIGS. 7A and 7B it can be seen that the camera or frame capturing device produces frames at the LCM rate 888888 with pixels scattered in special pseudo-random distributions. When a real image 705 is imaged through a video camera 710 including a lens 712 and an imaging target plane 711 (a video camera), pixel plates are scattered on imaging target 711 in a special Poisson-like distribution, illustrated in magnified section 730.

Figure 8:
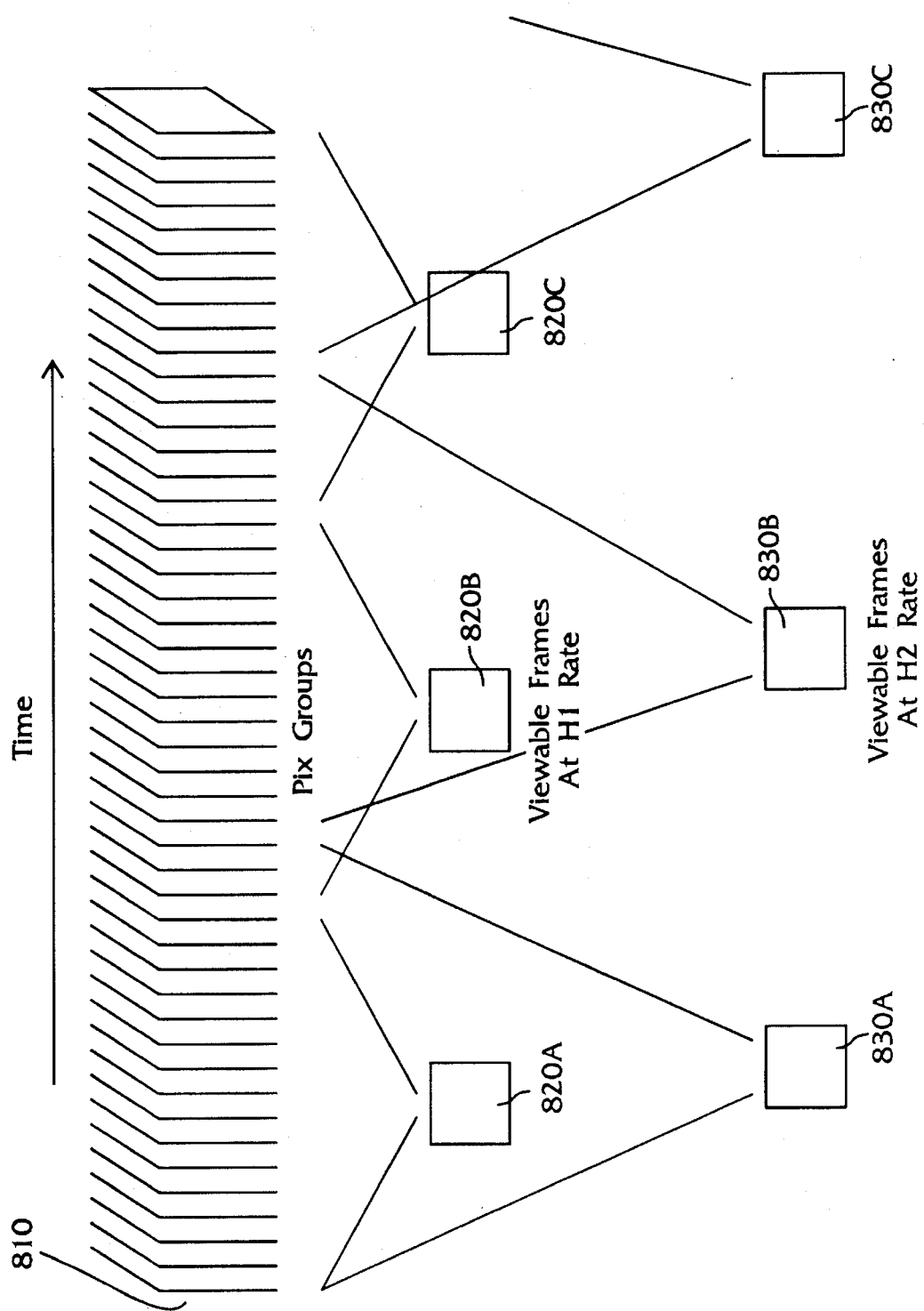
FIG. 8 shows the second mode of operation of the present invention, in which pixel groups are accumulated into viewable frames at a number of different frame rates.

In FIG. 7A, pixel groups are created directly by video camera 710 as a pixel plate data stream 790 under control of a pixel plate generator 740. Pixel plate generator 740 includes pixel plate mappings previously discussed with reference to pixel plate generator 240 in FIG. 2. Alternatively, therefore, the pixel groups could be created using the sub-system shown in FIG. 2. A pixel group corresponds to one LCM frame time's worth of pixel spots containing pixel plates. A series of pixel groups 810 can be seen in FIG. 8.

Display of the Pixel groups

Referring again to FIG. 6, a similar buffer and display system to FIG. 5 can be seen, except that a pixel group accumulator 640 and pixel shaper 645 is also used. Pixel group accumulator 640 is used since each pixel group, comprised of a series of pseudo-randomly distributed pixel plates captured at the higher LCM rate, is only a portion of a lower rate viewable frame, and is not directly viewable as are the pixel plate frames 401, 402, etc., discussed above in connection with FIG. 4A in operating mode one. Referring back to FIG. 8, therefore, it can be seen that frames 820A, 820B and 820C are viewable at a rate H1, while frames 830A, 830B and 830C are viewable at rate H2. Frame 820A, for example, is made up of a number (LCM/H1) of pixel group frames.

In general $LCM/H_{MAX}$ frames form a viewable frame, wherein all of the pixel plates are nearly a closely packed configuration. The pixel plates accumulation into a viewable subframe may differ slightly from closer packing with some small amount of overlap, uncovered pixels, or both. These properties are controlled by the pixel placement and shape generation algorithm or pre-stored look-up tables.

Pixel shaper 645 processes the incoming pixel plates from pixel plate data stream 790, and places them into the proper spatial locations in accumulator 640. In this manner, shaper 645 reconstructs the image created on the imaging target 711 in the accumulator 640. The accumulator 640 and shaper 645 architectures are relatively simple and flexible, and any number of designs can be easily implemented by a skilled artisan.

The fact that the pixel groups are not directly viewable in this embodiment on a frame-to-frame basis does not necessitate, however, the use of accumulator 640 and shaper 645. Through suitable control electronics known in the art, a collection of the smallest number of viewable pixel groups could be accumulated as a viewable frame in frame buffer 670. This viewable collection could then be sent directly to display 680.

The advantage of the present invention is now readily apparent. The data stream 790, because of its unique LCM pixel group format, is usable by any number of target display systems, and thus can be transmitted to all of them. In each target display system, buffer and display sub-systems accumulate the correct number of pixel groups.

For a system where the highest displayed frame rate is H (e.g. 75 Hz), the pixel distributions are designed so that an accumulation of LCM/H (e.g. 1800/75=24) pixel groups in accumulator 640 results in a very nearly or fully close-packed pixel accumulation allowing fully detailed view of the scene in the real image 705. In addition, when more pixel groups are accumulated corresponding to a slower picture rate S (e.g. 24 frames per second), then LCM/S frames (e.g. 1800/24=75) of these pixel groups combine to produce an even higher quality image. This process can be seen in FIG. 8, where more pixel groups are used to create viewable frames at the H2 rate than at the H1 rate. As with the method used and described above to optimize the placement of the pixel plates within each pixel group, the grouping of new pixel groups with old pixel groups within the accumulator 640 can result in increasing sharpness using non-moving images or motion compensated images as more pixel groups are added to the viewed frame. These groupings may start on any particular LCM pixel group. The pixel group relative placements can be generated through proper computer simulation using known techniques.

Higher Resolution Images Using Enhancement

A higher quality image at the S rate (e.g. 24 fps) is obtained by using the enhancement circuit 690 to perform difference computations as described in connection with FIG. 5 for the first mode of operation. These difference computations allow the overlap of the pixels to be used in a computation which determines implied values for pixels in a higher resolution frame. This allows a higher resolution frame to be displayed where motion at the H rate (e.g. 75 Hz) is not fast motion, or can be motion compensated, but where motion at the S rate (e.g. 24 fps) captures the picture in full detail. This is practical for those frames or portions of frames where the image moves very little during the H/S frames (e.g. approx 3) at the H rate (e.g. 75 Hz) or can be motion compensated.

Figure 9:
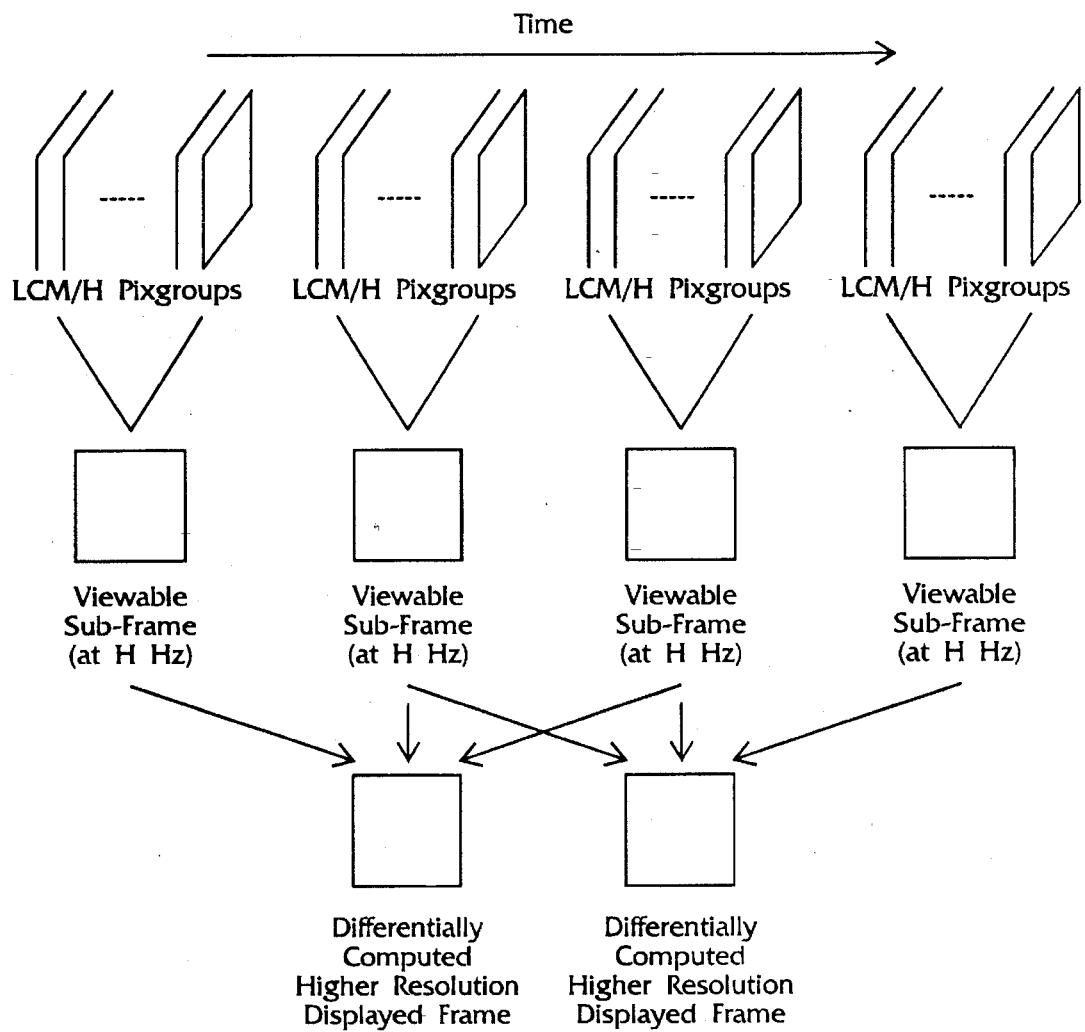
FIG. 9 shows the operation of an improvement to the basic embodiment of the second mode of operation of the present invention, in which the viewable frames are accumulated into higher resolution images.
Figure 10:
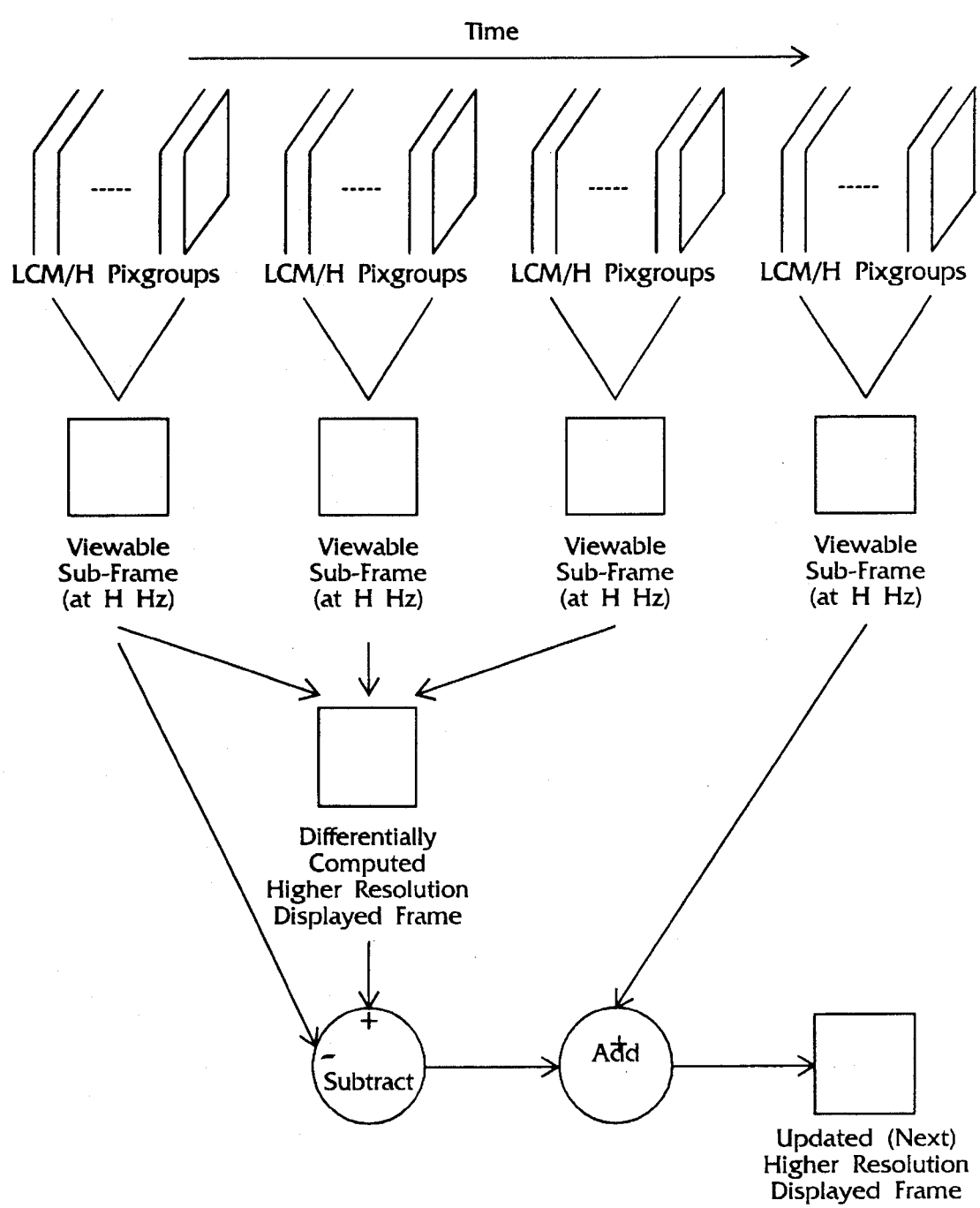
FIG. 10 shows the operation of a further improvement to the basic embodiment of the second mode of operation of the present invention, in which frames are compared against previous frames to determine whether a higher resolution image can be formed.

In enhancement circuit 690, each pixel at the H rate (e.g. 75 Hz) is compared with previous frames at the H (e.g. 75 Hz) rate to see if there is difference above some threshold. The comparison can be made using known motion compensation techniques. If the pixels within a region change significantly above some threshold, then the differential process for inferring higher resolution at the S rate (e.g. 24 fps) is not invoked. This indicates, for example, that the image is moving too rapidly. If for some other region or frame, the pixels are similar within some region, then a higher resolution picture frame can be constructed which accumulates frames at the S (e.g. 24 fps) rate or even slower, if appropriate, although the image may be updated at the H (e.g. 75 Hz) rate. This method can be easily extended to any number of frames at the H rate (e.g. 75 Hz) that can be inferred by using multiples of pixel groups at the LCM rate (e.g. 1800 Hz). An example of this method in operation can be seen in FIGS. 9 and 10.

Due to varying image motion, the foregoing method does not ensure that the same number of pixel differentials are used for each frame grouping at the resulting rate. However, the pseudo-random scattered nature of the pixel plates within pixel groups allows detail improvement to be relatively uniform over the entire frame, even in this partial frame accumulation case.

The use of enhancement based upon differential computation is best used when such processing time is longer than the frame time (e.g. 13.33 milliseconds) of the H rate (e.g. 75 Hz). Differential spot shape and placement knowledge is provided by the pseudo-random patterns which are generated as part of the Poisson-like pixel plate placement. This knowledge can be used for any accumulation of pixel groups in excess of the minimum $LCM/H_{MAX}$ number.

The LCM Rate

Any collection of pixel groups beyond the minimum number of $LCM/H_{MAX}$ (e.g. 1800/75 or 24 pixel groups) in the accumulator 640 is viewable. Thus all display rates slower than $H_{MAX}$ that are divisible into LCM can be accommodated by the present system. In FIG. 7, therefore, the pixel data stream 790 can be received by any system operating at one of the LCM divisible rates.

The LCM, or camera frame rate, can vary, depending on the nature and number of target display rates to be accommodated. For example, in the U.S., if 1/600 second is used as the sampling interval (LCM), 24 Hz (used for movie film) may be accommodated, as well as 25, 50, 60, and 75 target rates. With 1/1800 second, 72 Hz may also be directly extracted.

As an example, most adjustable multi-sync computer display screens can operate at either 72 Hz or 75 Hz; therefore, using a system with 1/600 second sampling is possible. For those images originated at 24 Hz, the display adjusts itself to 72 Hz. Using this idea, for all other pixel group-constructed material, the display operates at 75 Hz.

With appropriate dithering techniques, it is possible to accommodate even non-standard rates that are not evenly divisible into the LCM. For instance, if a display rate was 39 Hz, and the LCM was 600, the target display and buffer system accumulates 15 or 16 pixel groups at a time. This method uses a nearest integer approach, and results in an acceptable image with only minor errors.

For 600 Hz pixel groups, the number of pixel groups in each viewable time interval which need to be accumulated are as follows:

|  | Rate frames | # of 600 Hz pixel group |
| --- | --- | --- |
| U.S. Film | 24 | 25 |
| Europe Film | 25 | 24 |
| Non-Standard | 39 | 15/16 |
| Europe TV | 50 | 12 |
| U.S. TV | 60 | 10 |
| Computer | 75 | 8 |

Thus, for any particular display rate, the present invention provides an appropriate number of pixel group frames.

Other Embodiments—Source Auto-Synchroniser

Figure 11:
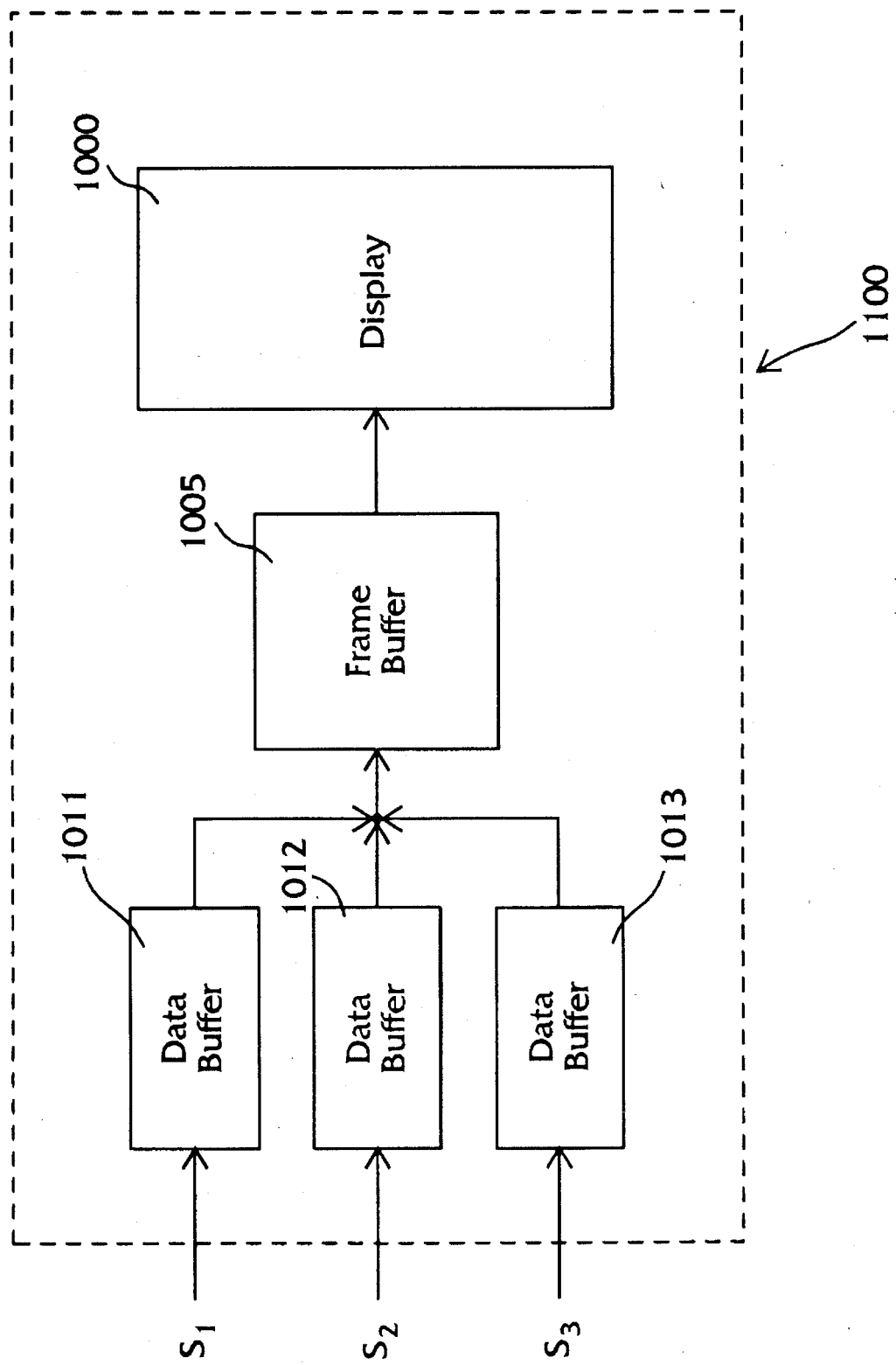
FIG. 11 is a block diagram of a multiple image display system, in which the present invention can be used to eliminate a series of data buffers normally required to process a series of incoming independently synchronized signals.

The present invention can also be used as a source auto-synchronizer. As shown in FIG. 11 a computer display 1000 receives multiple signals from multiple sources S1, S2 and S3. To display all possible source signals, a number of data buffers 1011, 1012 and 1013 are typically required to synchronize the input sources on the same display screen.

In a typical environment, the data input sources S1, S2, S3 could include satellite transmissions, professional broadcasts, computer networks, fiber-optic networks, teleconferencing channels, etc. The speed of light is 300,000 kilometers per second, and display frame rates are between 10 to 100 milliseconds. The difference between a source located 1 kilometer away, and another at 2,001 kilometers away is 2,000 kilometers, or about 6 milliseconds. Many potential situations of multi-signal data signals thereby involve processing signals from sources at various distances that span a significant portion of a frame time, and thus are delayed in varying amounts under ordinary circumstances. In a typical environment, therefore, the data buffers 1011, 1012 and 1013 provide the necessary synchronizing by providing an additional layer of buffering of the data that contains different synchronizing times.

It is a property of operating mode 2 of the pixel interlaced signal that frames have arbitrary starting times and can naturally adapt to any display rate, thus obviating the need for additional data buffers. Referring back to FIG. 6, the input data stream described in connection thereto can include several data sources. For example, originating signal source S1 could be running at 75 Hz using 600 Hz pixel groups; another source S2 could run at 60 Hz using 600 Hz pixel groups; and a third source S3 could run at 50 Hz using 600 Hz pixel groups. These values are given only for explanation, and any LCM rate could be used by the signal sources.

If a display in FIG. 6 is running at 24 Hz, a pixel group accumulator 640 processes 25 pixel group frames combined from the three sources in a fast frame buffer before updating the display. These image accumulations can start at any individual pixel group frame start time (every 1/1800 sec.) Thus, a wide variety of signal sources can be displayed simultaneously without the need for buffering capability.

In summary, the present invention, by using a pseudo-random pixel interlacing method, eliminates the artifacts commonly present in standard line raster scan imaging systems. Moreover, this novel pixel interlacing method permits the construction of higher resolution frames from a series of orthogonal lower resolution frames. The enhancement circuit of the present unit deduces information from previous pixel group frames and contributes additional detail to the pixels of the frame being processed. The format of the pixel interlaced data stream permits the present invention to be used in a wide variety of normally incompatible target display rates. Finally, the present invention can be used as an auto-synchronizer.

The foregoing illustrates but a few embodiments of the present invention. Other variations will be apparent to the skilled artisan. Accordingly, the scope of the present invention is to be determined by the following claims.

What is claimed is:

1. An image display system, comprising:
    an accumulation circuit for receiving and accumulating a succession of non-viewable pixel groups derived from pseudo-random pixel sets generated at a first rate to create a succession of viewable pixel frames at a second slower rate, said pixel frames relating to a succession of images;

a placement circuit coupled to the accumulation circuit for receiving said pixel frames;

an enhancement circuit coupled to the placement circuit, for placing a pixel frame corresponding to an image directly in a line buffer when an examination of prior pixel frames indicates that the image is fast moving, and for placing a differentially computed higher resolution image in the line buffer when the image is not fast moving;

a display coupled to the line buffer for viewing the image contained therein.

2. The system of claim 1, wherein the placement circuit places the pixel groups according to logical keys embedded in the pixel groups.

3. The system of claim 1, wherein a separate frame buffer is used for storing the pixel frames, and wherein additional higher resolution images are formed and stored in the frame buffer by combining the pixel frames in the line buffer with successive pixel frames.

4. The system of claim 1, whereby the pixel frames are compressed before they are received by the placement circuit, and are decompressed by the placement circuit before being placed in the line buffer.

5. The system of claim 1, wherein the pixel groups include motion compensation information.

6. The system of claim 1, wherein the image is transmitted to one or more additional displays.

7. The system of claim 1, wherein the display is updated using a non-standard raster scan.

8. An image processing system, comprising:

pixel group generating means for generating a succession of non-viewable pixel groups at a first rate from pseudo-random pixel data; and accumulation means coupled to the pixel group generating means for receiving and accumulating the pixel groups to create a succession of pixel frames at a second slower rate, said pixel frames relating to a succession of images; and placement means coupled to the accumulation means for receiving and placing said pixel frames; and line buffer means coupled to the placement means, wherein the placement means places the pixel frames in the line buffer means; and enhancement means for placing a pixel frame corresponding to an image directly in the line buffer means when an examination of prior pixel frames indicates that the image is fast moving, and for placing a differentially computed higher resolution pixel frame in the line buffer means when the image is not fast moving; and display means, operating at the second lower rate and coupled to the line buffer means for viewing the image corresponding to the pixel frame contained therein.

9. The system of claim 8, wherein the pixel frames are placed according to embedded logical keys.

10. The system of claim 8, wherein a separate frame buffer means is used for storing the pixel frames, and wherein additional higher resolution images are formed and stored in the frame buffer means by combining the pixel frames in the line buffer means with successive pixel frames.

11. The system of claim 8, whereby the pixel frames are compressed before they are received by the placement means, and are decompressed by the placement means before being stored in the line buffer means.

12. The system of claim 8, wherein the pixel groups include motion compensation information.

13. The system of claim 8, wherein the display means includes one or more displays updated using a non-standard raster scan.

14. A signal source autosynchronizing system, comprising:

a plurality of signal sources generating a plurality of non-viewable pixel groups consisting of pseudo-random pixel sets; and an accumulation circuit for receiving and accumulating said plurality of pixel groups to create a plurality of pixel frames representing a plurality of images; and a frame buffer coupled to the accumulation circuit for storing one or more of said pixel frames; and a placement circuit coupled to the accumulation circuit for receiving and placing the pixel frames; and a line buffer coupled to the placement circuit, wherein the placement circuit places the pixel frames in the line buffer; and an enhancement circuit coupled to the placement circuit, and cooperating therewith so as to place the pixel frames directly in the line buffer as a plurality of images when the corresponding images are fast moving, and so as to place differentially computed higher resolution images in the line buffer when said images are not fast moving; and a display coupled to the line buffer for viewing the images corresponding to the pixel frames contained therein.

15. The system of claim 14, wherein additional higher resolution images are formed and stored in the frame buffer by combining the pixel frames in the line buffer with successive pixel frames.

16. The system of claim 14, whereby the plurality of pixel frames are compressed before they are received by the placement circuit, and are decompressed by the placement circuit before being placed in the line buffer.

17. The system of claim 14, wherein the plurality of pixel groups include motion compensation information.

18. The system of claim 14, wherein the image is transmitted to one or more additional displays.

19. The system of claim 14, wherein the display is updated using a non-standard raster scan.

* * * * *